(12) United States Patent
Sugahara et al.

(10) Patent No.: US 7,815,138 B2
(45) Date of Patent: Oct. 19, 2010

(54) SPINNING REEL HANDLE ASSEMBLY

(75) Inventors: Ken'ichi Sugahara, Johor (MY); Yik Hui Chan, Johor (MY)

(73) Assignee: Shimano Components (Malaysia) SDN. BHD., Pontian (MY)

( * ) Notice: Subject to any disclaimer, the term of this patent is extended or adjusted under 35 U.S.C. 154(b) by 0 days.

(21) Appl. No.: 12/025,557

(22) Filed: Feb. 4, 2008

(65) Prior Publication Data
US 2008/0191079 A1  Aug. 14, 2008

(30) Foreign Application Priority Data
Feb. 13, 2007  (JP) .............................. 2007-032492

(51) Int. Cl.
*A01K 89/00* (2006.01)
(52) U.S. Cl. ...................... 242/283; 242/282
(58) Field of Classification Search ................. 242/282, 242/283
See application file for complete search history.

(56) References Cited

U.S. PATENT DOCUMENTS

| | | | |
|---|---|---|---|
| 5,244,166 A * | 9/1993 | Oi | 242/284 |
| 5,690,289 A * | 11/1997 | Takeuchi et al. | 242/282 |
| 6,176,446 B1 * | 1/2001 | Sato | 242/319 |
| 6,626,385 B1 * | 9/2003 | Tsutsumi | 242/282 |
| 6,883,738 B2 * | 4/2005 | Nakajima et al. | 242/282 |
| 7,070,137 B2 * | 7/2006 | Nishikawa et al. | 242/282 |
| 7,163,168 B2 * | 1/2007 | Sugawara et al. | 242/284 |
| 7,374,119 B2 * | 5/2008 | Ochiai et al. | 242/283 |
| 2003/0205637 A1 * | 11/2003 | Nakajima et al. | 242/283 |
| 2004/0140385 A1 * | 7/2004 | Nishikawa et al. | 242/283 |
| 2004/0200915 A1 * | 10/2004 | Nishikawa | 242/282 |
| 2007/0023555 A1 * | 2/2007 | Chang | 242/282 |
| 2008/0257996 A1 * | 10/2008 | Ochiai et al. | 242/224 |

FOREIGN PATENT DOCUMENTS

| | | |
|---|---|---|
| EP | 1645184 A | 4/2006 |
| JP | S61-003323 Y | 2/1986 |
| JP | H04-030861 U | 3/1992 |

* cited by examiner

*Primary Examiner*—Evan H Langdon
(74) *Attorney, Agent, or Firm*—Shinjyu Global IP

(57) ABSTRACT

A handle assembly includes a handle shaft portion, a handle arm, a handle grip, and a tubular member. The handle shaft portion is mounted to the inner peripheral portion of a master gear shaft so as not to be allowed to rotate relative to the master gear shaft, and is disposed so that the tip end portion of the master gear shaft protrudes outward in the axial direction compared to the tip end portion of the master gear. The handle arm extends in the radial direction from the tip end portion of the handle shaft portion, and is mounted to the handle shaft portion so as to be capable of pivoting with respect to the handle shaft portion. The handle grip is mounted to the tip of the handle arm. The tubular member is non-rotatably engaged with the tip end portion of the master gear shaft and the base end portion of the handle arm.

19 Claims, 6 Drawing Sheets

SPINNING REEL HANDLE ASSEMBLY

CROSS-REFERENCE TO RELATED APPLICATIONS

This application claims priority under 35 U.S.C. §119(a) to Japanese Patent Application No. 2007-032492, filed in Japan on Feb. 13, 2007, the entire contents of which are hereby incorporated herein by reference.

BACKGROUND OF THE INVENTION

1. Field of the Invention

The present invention relates to a handle assembly, and more particularly to a handle assembly configured to be mounted to and integrally rotatable with a master gear shaft that is rotatably mounted to a reel unit of a spinning reel.

2. Background Information

A spinning reel generally includes a reel unit with a handle assembly that is mounted to a fishing rod, a spool mounted to the reel unit and is capable of moving back and forth, and a rotor that is rotatively supported in the reel unit and serves to wind a fishing line around the spool. The handle assembly includes a handle shaft portion, a handle arm that is pivotably mounted to the tip of the handle shaft and extends in a radial direction, and a handle grip that is mounted to the tip of the handle arm. In Japanese Utility Model Publication No. H04-30861, for example, the handle shaft portion is mounted to and integrally rotates with a master gear shaft that is rotatably mounted to the reel unit.

In this type of handle assembly, the handle shaft portion and the master gear shaft are configured to rotate integrally as one unit by engaging both members with a non-circular engagement. However, because of this particular arrangement, a wobbling effect may occur between the handle shaft portion and the master gear shaft. A known configuration for preventing the above described wobbling effect is provided in, for example, Japanese Utility Model application publication No. S61-3323. Here, the base end surface of the handle shaft portion and the opposed tip end surface of the master gear shaft are provided with engaging saw-tooth shaped concave-convex portions.

In another type of handle assembly where the handle arm is pivotably mounted to the tip end portion of the handle shaft portion, a gap between the handle arm and the handle shaft portion is necessary for folding the handle arm. As a result, there is a potential risk that wobbling can occur between the handle arm and the master gear shaft.

SUMMARY OF THE INVENTION

One object of the present invention is to prevent wobbling between the handle arm and the master gear shaft in the handle assembly.

In accordance with a preferred aspect of the present invention, there is provided a handle assembly for a spinning reel that is configured to be mounted to and integrally rotatable with a master gear shaft that is rotatably mounted to a reel unit. The handle assembly includes a handle arm having a base end portion configured to be integrally rotatable with the master gear shaft, a handle shaft portion engaged and integrally rotatable with the master gear shaft and the handle arm, and a tubular member configured to be engaged with the master gear shaft and the handle arm.

The handle assembly, according to yet another aspect of the present invention, is directed to the tubular member having a first tubular member and a second tubular member, wherein the first tubular member is mounted to an outer peripheral portion of the second tubular member.

The handle assembly, according to still another aspect of the present invention, is directed to the second tubular member that includes at least one engaging portion configured to engage the master gear shaft and a base end portion of the handle arm.

The handle assembly, according to yet another aspect of the present invention, is directed to the at least one engaging portion that includes at least one recess and at least one tapered protrusion, both of which extending towards the handle arm.

The handle assembly, according to a further aspect of the present invention, is directed to the first tubular member having an inner contact surface.

The handle assembly, according to a further aspect of the present invention, is directed to the second tubular member having an abutment projecting from its outer peripheral portion.

The handle assembly, according to another aspect of the present invention, further includes an urging member. The urging member is disposed between the inner contact surface and the abutment to urge the first tubular member toward the handle arm.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
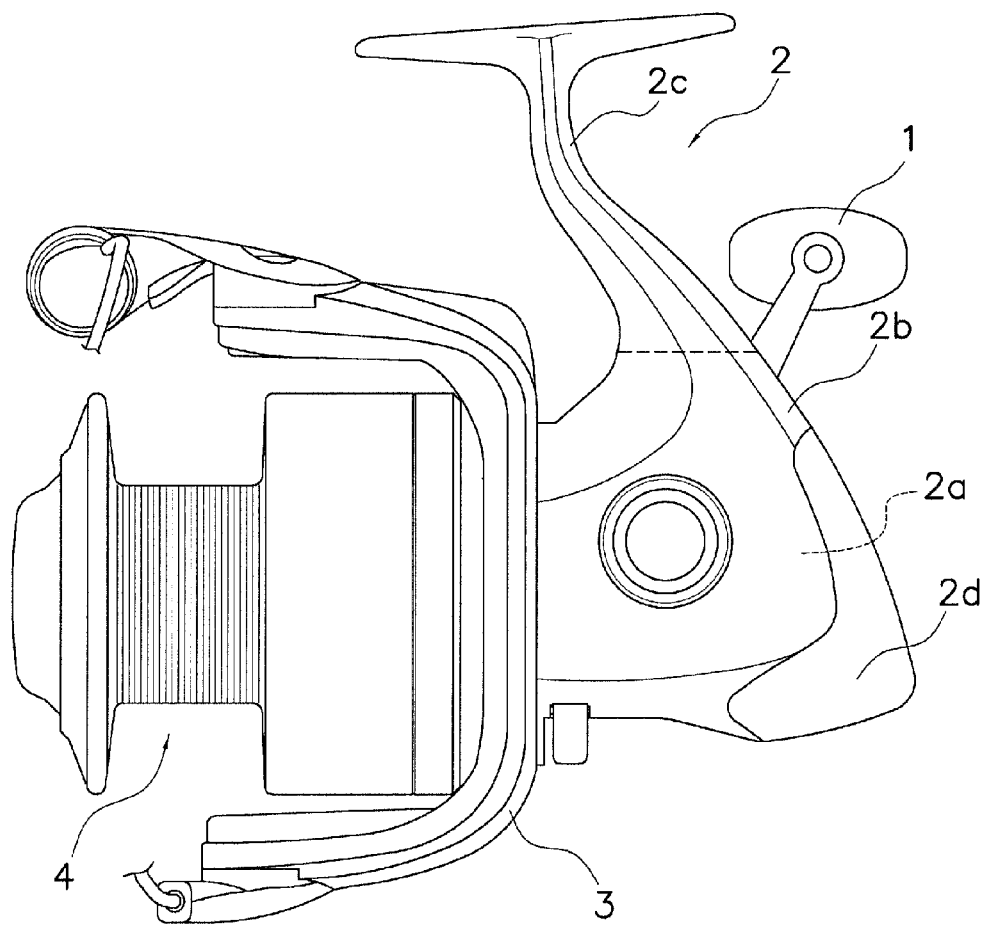
FIG. 1 is a lateral view of a spinning reel in which an embodiment of the present invention is employed.

In the following detailed description, for purpose of explanation, numerous specific details are set forth in order to provide a thorough understanding of the present invention. It will be apparent, however, that the present invention may be practiced without these specific details. In other instances, well-known structures and devices are schematically shown in order to simplify the drawing.

As illustrated in FIGS. 1 to 4, a spinning reel in which an embodiment of the present invention is employed includes a handle assembly 1, a reel unit 2 for rotatably supporting the handle assembly 1, a rotor 3, and a spool 4. The rotor 3 is a unit for winding fishing line around the spool 4, and is rotatably supported at the front portion of the reel unit 2. The spool 4 serves to wind fishing line around the outer peripheral surface thereof, and is disposed on the front of the rotor 3 so as to be capable of moving back and forth. Note that the handle assembly 1 is allowed to be mounted to either the right side (FIGS. 1 and 2) or the left side (FIGS. 3 and 4) of the reel unit 2, and a bolt member 19 with a cap is mounted to the side of the reel unit 2 on which the handle assembly 1 is not being mounted (right side of the reel unit 2 in FIGS. 3 and 4).

Figure 3:
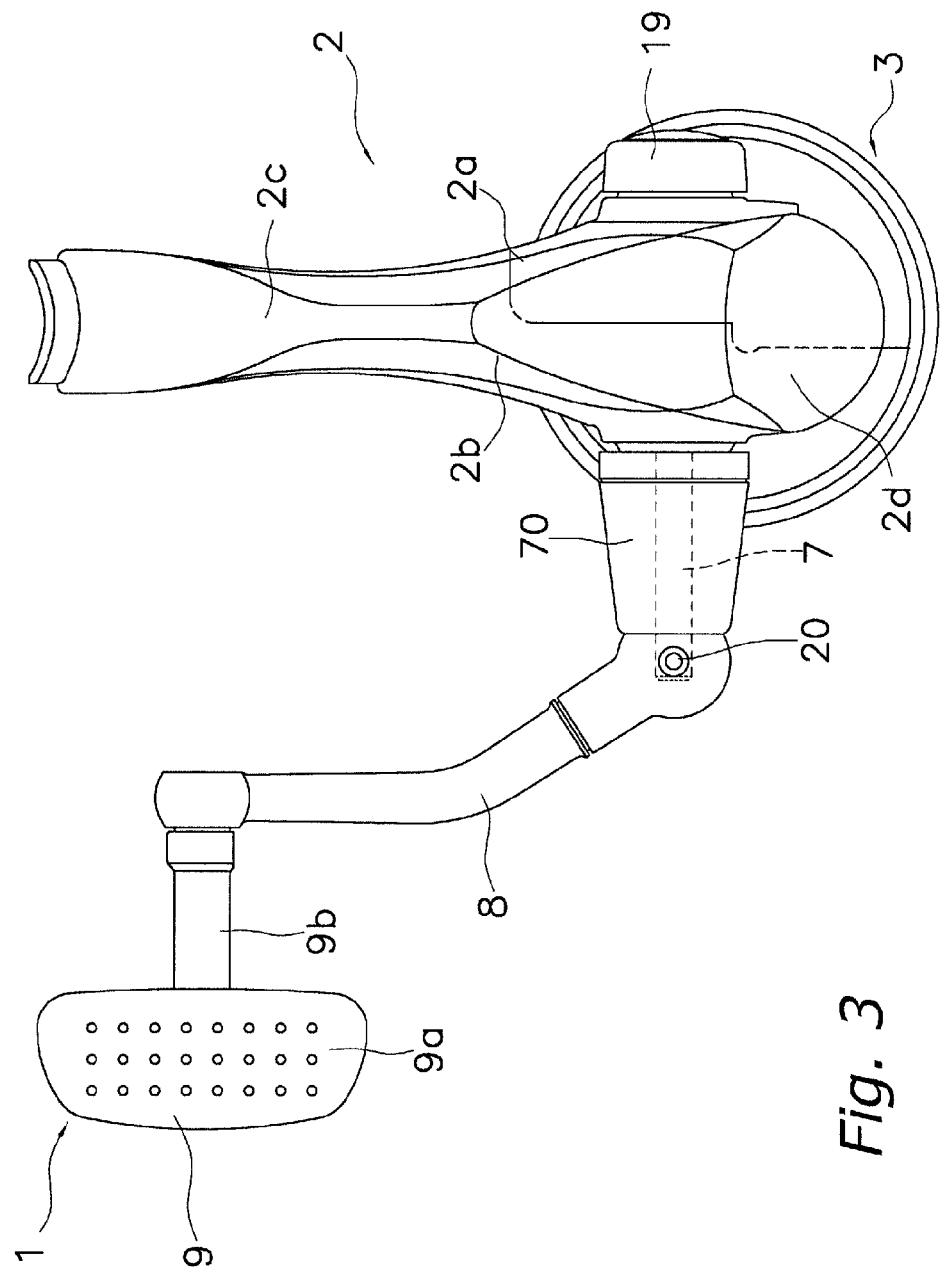
FIG. 3 is a rear view of the spinning reel.
Figure 4:
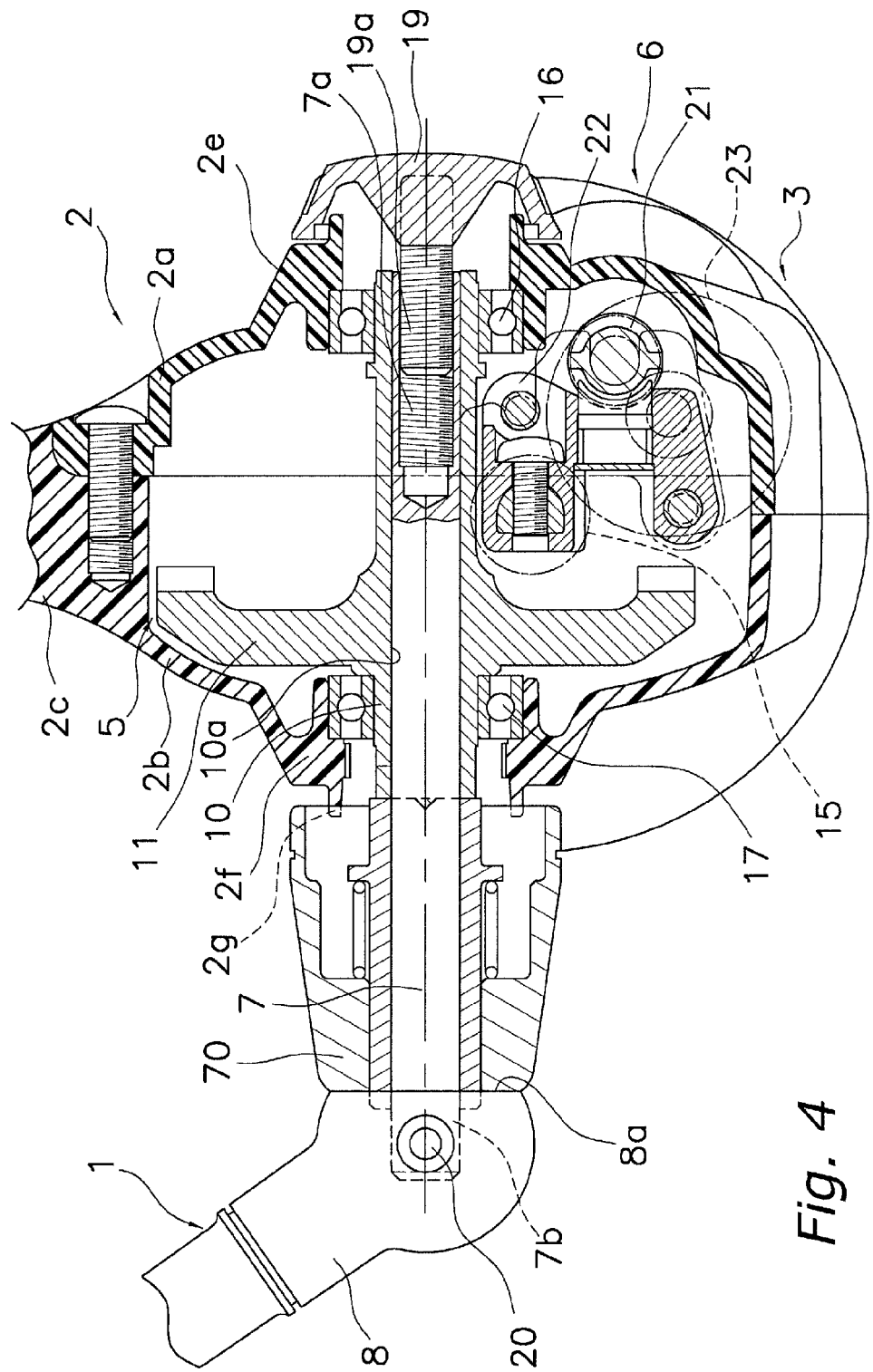
FIG. 4 is a rear cross-sectional view of the spinning reel.

As illustrated in FIGS. 3 and 4, the handle assembly 1 includes a handle shaft portion 7, a handle arm 8, a handle grip 9, and a tubular member 70. The handle shaft portion 7 is mounted to the inner peripheral portion of a master gear shaft 10 so as not to be allowed to rotate relative to the master gear shaft 10, and is disposed so that the tip end portion thereof protrudes outward in the axial direction compared to the tip end portion of the master gear 10. The handle arm 8 extends in the radial direction from the tip end portion of the handle shaft portion 7, and is mounted to the handle shaft portion 7 so as to be capable of pivoting with respect to the handle shaft portion 7. The handle grip 9 is mounted to the tip of the handle arm 8. The tubular member 70 is non-rotatably engaged with the tip end portion of the master gear shaft 10, and is non-rotatably engaged with the base end portion of the handle arm 8.

As illustrated in FIG. 4, the handle shaft portion 7 is formed to have a non-circular outer shape (e.g., rectangular), and is mounted to a through-hole 10a of the master gear shaft 10 so as not to be allowed to rotate but to be allowed to move in the axial direction. A female threaded portion 7a is formed in the inner peripheral side of the end portion (right end portion in FIG. 4) of the handle shaft portion 7, and a male threaded portion 19a of the bolt member 19 with a cap is screwed into the female threaded portion 7a of the handle shaft portion 7 that is mounted to the through-hole 10a. Accordingly, the handle shaft portion 7 is retained with respect to the master gear shaft 10. In addition, a handle arm 8 is fixed to a tip end portion 7b (left end portion in FIG. 4) of the handle shaft portion 7 by means of a bolt member 20.

As illustrated in FIG. 3, the handle arm 8 is a rod-shaped member made of a material such as, but not limited to, aluminum alloy and is formed to be bent to a certain degree toward the opposed side to the reel unit 2. An end of the handle arm 8 (lower end portion in FIG. 3) is coupled to the tip end portion (left end portion in FIG. 3) of the handle shaft portion 7 by means of the bolt member 20 so as to be allowed to pivot in directions toward and away from the reel unit 2. The handle grip 9 is rotatably mounted to the other end (upper end portion in FIG. 3) of the handle arm 8.

As illustrated in FIG. 3, the handle grip 9 includes a shaft portion 9b and a grip portion 9a. The shaft portion 9b is mounted to the handle arm 8 so as to be capable of rotating around an axis approximately parallel to the handle shaft portion 7. The grip portion 9a is fixed to the tip of the shaft portion 9b and is held by an angler. The grip portion 9a can be made of a synthetic resin, a cork, or the like. The shaft portion 9b can be made of metal or any combination thereof.

Figure 5:
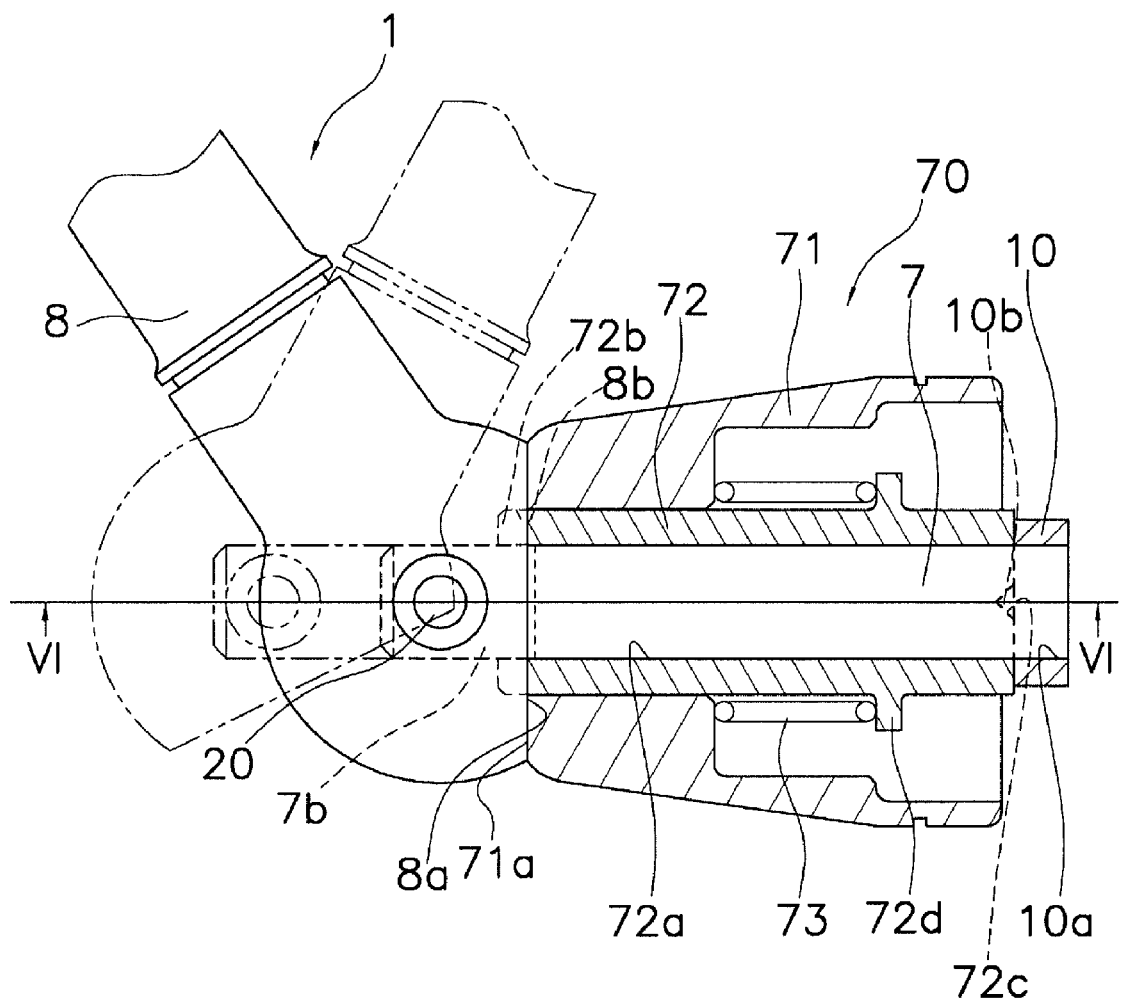
FIG. 5 is an enlarged cross-sectional view of a handle assembly.

As illustrated in FIG. 5, the tubular member 70 includes a first tubular member 71, a second tubular member 72, and a biasing or urging member 73, preferably a spring member. The first tubular member 71 has a tubular shape and is provided separately from the handle shaft portion 7. The second tubular member 72 is mounted to the inner peripheral side of the first tubular member 71. The second tubular member 72 is also non-rotatably engaged with the tip end portion of the master gear shaft 10 and the base end portion of the handle arm 8. The spring member 73 is disposed between the first tubular member 71 and the second tubular member 72, and urges the first tubular member 71 toward the handle arm 8.

As illustrated in FIG. 5, the first tubular member 71 is mounted to the outer peripheral portion of the second tubular member 72 so as to cover the entire second tubular member 72. The first tubular member 71 is a tubular-shaped member wherein the diameter thereof gradually decreases to a certain extent toward the handle arm 8. The tip end portion (left end portion in FIG. 5) of the first tubular member 71 includes a contact portion 71a that is allowed to make contact with a contact portion 8a of the base end portion of the handle arm 8. When fastening the bolt member 19 to the side of the reel unit 2, the contact portion 71a of the first tubular member 71 is press against the contact portion 8a of the base end portion of the handle arm 8. Accordingly, the handle arm 8 is non-pivotably fixed to the reel unit 2.

Figure 6:
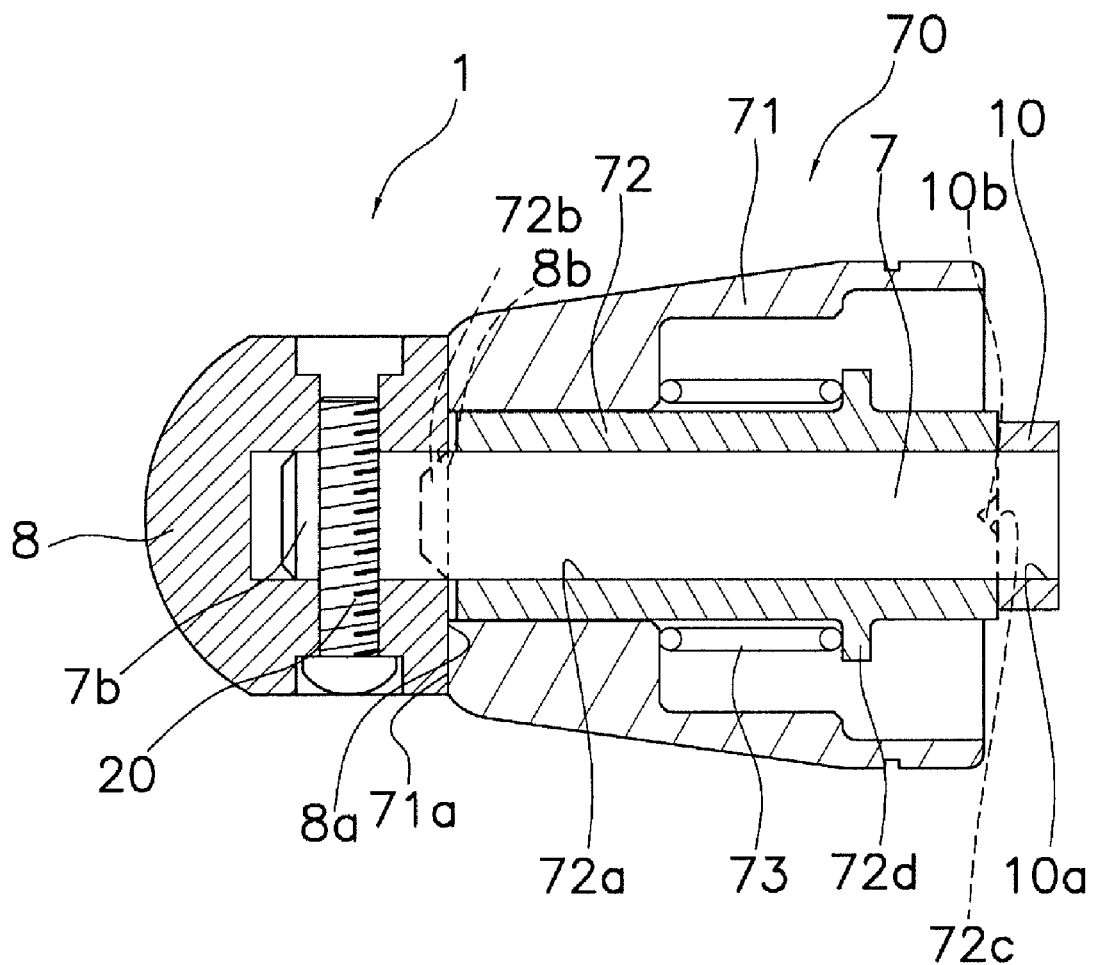
FIG. 6 is a cross-sectional view taken along line VI-VI in FIG. 5.

As illustrated in FIG. 5, a non-circular portion 72a of the inner peripheral portion of the second tubular member 72 is mounted to the handle shaft portion 7 so as not to be allowed to rotate relative to the handle shaft 7 but to be allowed to move in the axial direction. The first tubular member 71 is mounted to the outer peripheral portion of the second tubular member 72 so as to be urged toward the handle arm 8 (leftward in FIG. 5) by means of the compressed spring member 73. The second tubular member 72 includes an engaging portion 72b, a second engaged portion 72c, and an annular abutment 72d. The engaging portion 72b, for example, is composed of two protrusions that protrude from the tip end portion (left side in FIG. 5) of the second tubular member 72 toward the handle arm 8. The second engaged portion 72c, for example, is composed of four recesses that are formed in the rear end (right side in FIG. 5) of the second tubular member 72 and are formed to be dented toward the handle arm 8. The abutment 72d is formed to protrude from the outer peripheral portion of the second tubular member 72 and function as a portion making contact with the rear end (right side in FIG. 5) of the spring member 73. The contact portion 8a of the handle arm 8 includes a first engaged portion 8b in the form of two recesses. The engaging portion 72b is allowed to engage with the first engaged portion 8b. When the engaging portion 72b is engaged with the first engaged portion 8b, the handle arm 8 and the second tubular member 72 are prevented from rotating relatively to each other. The second engaged portion 72c is allowed to engage with an engaging portion 10b that includes four protrusions that protrude from the tip end portion of the master gear shaft 10 toward the handle arm 8. When the engaging portion 10b is engaged with the second engaged portion 72c, the second tubular member 72 and the master gear shaft 10 are prevented from rotating relative to each other. In addition, as illustrated in FIGS. 5 and 6, the engaging portion 72b has a tapered portion that extends toward the handle arm 8. Thus, even if there is a gap between the engaged portion 8b and the engaging portion 72b, the engaging portion 72b is reliably allowed to engage with the first engaged portion 8b by moving the taper portion of the engaging portion 72b in the axial direction. Accordingly, it is possible to prevent wobbling from being generated when the engaging portion 72b is engaged with the engaged portion 8b. Here, it is possible to prevent the handle arm 8 and the master gear shaft 10 from rotating relative to each other through the second tubular member 72 of the tubular member 70.

As illustrated in FIG. 4, when the above described handle arm 8 is folded, the bolt member 19 with a cap, which is screwed onto the handle shaft portion 7, is loosened so that a gap is generated between the second tubular member 72 and the base end portion of the handle arm 8. Then, when the handle arm 8 is pivoted toward the reel unit 2, it is possible to fold the handle arm 8.

As illustrated in FIGS. 1 to 4, the reel unit 2 includes a reel body 2a in which an opening is formed, a lid member 2b that is detachably/reattachably mounted to the reel body 2a so as to cover the opening, a rod attachment leg 2c that extends obliquely upward and frontward from the lid member 2b, and a cover member 2d that is mounted to the reel body 2a and lid member 2b so as to cover the area raging from the rear portion to the lower portion of the reel body 2a and lid member 2b. The reel body 2a has a space in the interior thereof. A rotor driving mechanism 5 for rotating the rotor 3 in conjunction with the rotation of the handle assembly 1 and an oscillating mechanism 6 for winding fishing line by moving the spool 4 back and forth are provided in the space.

Figure 2:
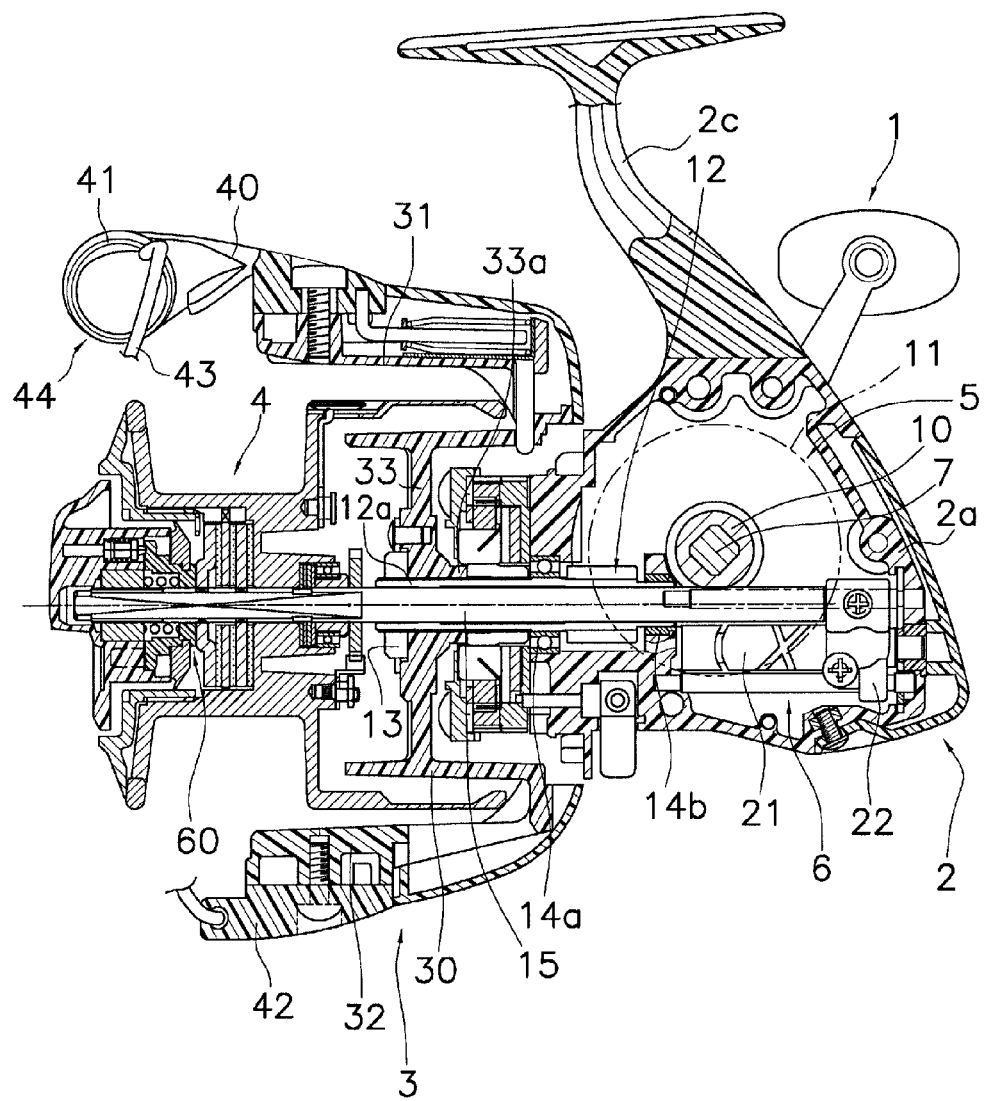
FIG. 2 is a lateral cross-sectional view of the spinning reel.

As illustrated in FIGS. 2 and 4, the rotor driving mechanism 5 includes a master gear 11 that rotates with the master gear shaft 10 to which the handle shaft portion 7 of the handle assembly 1 is non-rotatably mounted, and a pinion gear 12 that meshes with the master gear 11. As illustrated in FIG. 4, the master gear shaft 10 is a tubular member that is integrally formed with the master gear 11, and includes the through-hole 10a on the inner peripheral portion thereof, which has a non-circular shape such as rectangular or the like. As illustrated in FIG. 4, the master gear shaft 10 is rotatably supported in the reel unit 2 by bearings 16 and 17 that are mounted to the inner peripheral portions of bosses 2e and 2f protruding toward the sides of the reel unit 2. The master gear 11 is a face gear that meshes with the pinion gear 12. The pinion gear 12 is formed in a tubular shape and penetrates the center portion of the rotor 3. Also, a front portion 12a of the pinion gear 12 is fixed to the rotor 3 by a nut 13. In addition, the intermediate portion and the rear end portion of the pinion gear 12 are rotatably supported in the reel unit 2 through bearings 14a and 14b, respectively.

As illustrated in FIGS. 2 and 4, the oscillating mechanism 6 is a mechanism for moving the spool 4 back and forth together with a drag mechanism 60 by moving a spool shaft 15 back and forth, which penetrates the center portion of the spool 4 and is coupled to the drag mechanism 60. The oscillating mechanism 6 includes a worm shaft 21 that is disposed below and parallel to the spool shaft 15, a slider 22 that moves along the warm shaft 21 in a front-to-rear direction, and an intermediate gear 23 that is fixed to the tip of the worm shaft 21. The slider 22 is non-rotatably fixed to the rear end of the spool shaft 15. The intermediate gear 23 meshes with the pinion gear 12 through a reduction gear (not illustrated in the figures). The reciprocating speed of the oscillation mechanism 6 is slowed down by the reduction gear, and accordingly it is possible to densely wind the fishing line onto the spool 4.

As illustrated in FIG. 2, the rotor 3 includes a cylindrical portion 30, a first rotor arm 31 and a second rotor arm 32 that are arranged to be opposed to each other on the sides of the cylindrical portion 30. The cylindrical portion 30, the first rotor arm 31, and the second rotor arm 32 are integrally formed. A front wall 33 is formed in the front part of the cylindrical portion 30, and a boss 33a is formed in the center portion of the front wall 33. A through-hole is formed in the center portion of the boss 33a. The front portion 12a of the pinion gear 12 and the spool shaft 15 penetrate the through-hole. The nut 13 is disposed at the front of the front wall 33, and the front portion 12a of the pinion gear 12 is fixed to the rotor 3 by the nut 13.

The first rotor arm 31 curves convexly outward and extends forward from the cylindrical portion 30. A first bail support member 40 is pivotably mounted to the outer peripheral side of the tip of the first rotor arm 31. A line roller 41 for guiding the fishing line onto the spool 4 is mounted to the tip of the first bail support member 40. The second rotor arm 32 curves convexly outward and extends forward from the cylindrical portion 30. A second bail support member 42 is pivotably mounted to the outer peripheral side of the tip of the second rotor arm 32. A bail member 43 having a curved U-shape is made of wire and fixed between the line roller 41 and the second bail support member 42. The first bail support member 40, the second bail support member 42, the line roller 41, and the bail member 43 make up a bail arm 44. The bail arm 44 is allowed to swing between a line-guiding posture as illustrated in FIG. 2 and a line-releasing posture that flips from the line-guiding posture.

An anti-reverse rotation mechanism 50 for preventing/allowing reverse rotation of the rotor 3 is disposed in the interior of the cylindrical portion 30 of the rotor 3. The anti-reverse rotation mechanism 50 includes a roller-type one-way clutch 51 with a freely rotating inner ring, and a switching mechanism 52 that switches the one-way clutch 51 between an operating state (i.e., reverse rotation is prohibited) and a non-operating state (i.e., reverse rotation is allowed).

As illustrated in FIG. 2, the spool 4 is disposed between the first rotor arm 31 and the second rotor arm 32 of the rotor 3, and is mounted to the tip of the spool shaft 15 through the drag mechanism 60.

Next, the operation and movement of the reel will be described.

When the bail arm 44 is flipped for the purpose of releasing the fishing line from the reel unit 2 during casting, the first bail support member 40 and the second bail support member 42 are swung and accordingly it is possible to set the bail arm 44 in the line-releasing posture. In this state, the fishing rod can be cast while an angler hooks the fishing line with the index finger of the hand with which the fishing rod is held. Thus, fishing line is released with high momentum due to the weight of the tackle. When the handle assembly 1 is rotated in the line-winding direction, the rotor 3 rotates in the line-winding direction due to the rotor driving mechanism 5, and the bail tripping mechanism (not illustrated in the figures) returns the bail arm 44 to the line-winding position, and the fishing line is wound around the spool 4.

In the handle assembly 1 of the spinning reel with the above described configuration, the second tubular member 72 and the master gear shaft 10 are prevented from relatively rotating with each other by engaging the engaging portion 10b of the master gear shaft 10 with the second engaged portion 72c of the second tubular member 72 forming a part of the tubular member 70, and the handle arm 8 and the second tubular member 72 are prevented from relatively rotating with each other by engaging the engaging portion 72b of the second tubular member 72 forming a part of the tubular member 70 with the first engaged member 8b of the handle arm 8. Here, it is possible to prevent the handle arm 8 and the master gear shaft 10 from relatively rotating with each other through the second tubular member 72 forming a part of the tubular member 70. Accordingly, it is possible to reliably prevent wobble from being generated between the handle arm 8 and the master gear shaft 10. Also, when wobble is prevented from being generated between the handle arm 8 and the master gear shaft 10, it is possible to further prevent wobble from being generated in the handle shaft portion 7. Accordingly, the bolt member 19 with a cap, which is screwed onto the handle shaft portion 7, is prevented from being easily loosened.

Other Embodiments

While only a selected embodiment has been chosen to illustrate the present invention, it will be apparent to those skilled in the art from this disclosure that various changes and modifications can be made herein without departing from the scope of the invention as defined in the appended claims. For instance, in the above described embodiment, a handle assembly including a first and a second tubular member is exemplified, but the present invention is not limited thereto, and may include only one tubular member, preferably one connected directly to the master gear shaft. In this embodiment, there would be no need for the abutment 72d or the biasing or urging member 73. Also, in the above described embodiment, a spinning reel including a front drag mechanism is exemplified, but the present invention is not limited thereto, and may be applied to a spinning reel including both a front drag mechanism and a lever drag mechanism. Furthermore, the foregoing description of the embodiment according to the present invention is provided for illustration only, and not for the purpose of limiting the invention as defined by the appended claims and their equivalents. Thus, the scope of the invention is not limited to the disclosed embodiment.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

Also, terms such as "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a handle assembly equipped with the present invention.

In addition, terms of degree the word "approximately" as used herein mean a reasonable amount of deviation of the modified term such that the end result is not significantly changed. For example, these terms can be construed as including a deviation of at least .±.5% of the modified term if this deviation would not negate the meaning of the word it modifies. The term "configured" as used herein to describe a component, section or part of a device is constructed to carry out a desired function. Accordingly, these terms, as utilized to describe the present invention, should be interpreted relative to a handle assembly equipped with the present invention.

What is claimed is:

1. A handle assembly of a spinning reel configured to rotate integrally with a master gear shaft rotatably mounted to a reel unit of the spinning reel, the handle assembly comprising:
   a handle arm having a base end portion configured to rotate integrally with the master gear shaft;
   a handle shaft portion engaged to rotate integrally with the master gear shaft and the handle arm, the handle shaft portion being configured to rotate with the master gear shaft by way of a non-circular engagement; and
   a tubular member including a first tubular member and a second tubular member slidably coupled to an inner peripheral surface of the first tubular member, the second tubular member having at least one protrusion formed on a first end of the second tubular member to engage with at least one recess formed in the base end of the handle arm and at least one recess formed in a second end of the second tubular member to engage with a protrusion formed on an end of the master gear shaft, the first and second tubular members being configured and arranged to rotate integrally with the master gear shaft and the handle arm to prohibit uneven erratic rotational movement between the tubular member, the master gear shaft, and the handle arm.

2. The handle assembly as set forth in claim 1, wherein the at least one protrusion formed on the first end of the tubular member includes at least one tapered protrusion.

3. The handle assembly as set forth in claim 2, wherein the protrusion formed on the master gear shaft includes at least one protrusion configured to engage with the at least one recesses formed in the second end of the second tubular member.

4. The handle assembly as set forth in claim 1, wherein the first tubular member includes an inner contact surface.

5. The handle assembly set forth in claim 4, wherein the second tubular member includes an abutment projecting radially outward from an outer peripheral side of the second tubular member.

6. The handle assembly as set forth in claim 5, further comprising
   an urging member disposed between the inner contact surface and the abutment to slidably move the first tubular member toward the handle arm.

7. A spinning reel comprising:
   a reel unit;
   a rotor rotatably supported on the reel unit;
   a spool arranged on the rotor;
   a master gear shaft rotatably mounted to the reel unit; and
   a handle assembly configured to be integrally rotatable with the master gear shaft, the handle assembly including
      a handle arm having a base end portion configured to rotate integrally with the master gear shaft,
      a handle shaft portion engaged to rotate integrally with the master gear shaft and the handle arm, the handle shaft portion being configured to rotate with the master gear shaft by way of a non- circular engagement, and
      a tubular member including a first tubular member and a second tubular member slidably coupled to an inner peripheral surface of the first tubular member, the second tubular member having a protrusion formed on a first end of the second tubular member to engage with at least one recess formed in the base end of the handle arm and at least one recess formed in a second end of the second tubular member to engage with a protrusion formed on an end of the master gear shaft, the first and second tubular members being configured and arranged to rotate integrally with the master gear shaft and the handle arm to prohibit uneven erratic rotational movement between the tubular member, the master gear shaft, and the handle arm.

8. The spinning reel as set forth in claim 7, wherein the at least one protrusion formed on the first end of the second tubular member includes at least one tapered protrusion.

9. The handle assembly as set forth in claim 8, wherein the protrusion formed on the master gear shaft includes at least one protrusion configured to engage with the at least one of the recesses formed in the second end of the second tubular member.

10. The spinning reel as set forth in claim 7, wherein the first tubular member includes an inner contact surface.

11. The spinning reel as set forth in claim 10, wherein the second tubular member includes an abutment projecting radially outward from an outer peripheral side of the second tubular member.

12. The spinning reel as set forth in claim 11, further comprising an urging member disposed between the inner contact surface and the abutment to slidably move the first tubular member toward the handle arm.

13. A handle assembly for a spinning reel configured to rotate integrally with a master gear shaft rotatably mounted to a reel unit of the spinning reel, the handle assembly comprising:
- a handle arm having a base end portion configured to rotate integrally with the master gear shaft;
- a handle shaft portion engaged to rotate integrally with the master gear shaft and the handle arm, the handle shaft portion being configured to rotate with the master gear shaft by way of a non-circular engagement; and
- a tubular member including at least one tapered protrusion formed on a first end of the tubular member to engage with at least one recess formed in the base end of the handle arm and at least one recess formed in a second end of the tubular member to engage with a protrusion formed on an end of the master gear shaft, the tubular member being securely disposed between and configured to rotate integrally with the master gear shaft and the handle arm to prevent uneven rotational movement between the tubular member, the master gear shaft, and the handle arm.

14. The handle assembly as set forth in claim 13, wherein the tubular member further includes a first tubular member and a second tubular member substantially concentric with the first tubular member, the first tubular member being slidably mounted on an outer peripheral side of the second tubular member.

15. The handle assembly as set forth in claim 14, wherein the at least one tapered protrusion is formed on a first end of the second tubular member.

16. The handle assembly as set forth in claim 15, wherein the at least one recess is formed in a second end of the second tubular member.

17. The handle assembly as set forth in claim 14, wherein the first tubular member includes an inner contact surface.

18. The handle assembly set forth in claim 17, wherein the second tubular member includes an abutment projecting radially outward from the outer peripheral side of the second tubular member.

19. The handle assembly as set forth in claim 18, further comprising an urging member disposed between the inner contact surface and the abutment to slidably move the first tubular member toward the handle arm.

* * * * *